United States Patent
Komarynsky

(10) Patent No.: US 6,837,603 B2
(45) Date of Patent: Jan. 4, 2005

(54) EMERGENCY TAILLIGHT FOR VEHICLES, ESPECIALLY FOR MOTOR VEHICLES

(76) Inventor: Sergiy Komarynsky, PMB # 153 80 Burr Ridge Pkwy., Burr Ridge, IL (US) 60527

(*) Notice: Subject to any disclaimer, the term of this patent is extended or adjusted under 35 U.S.C. 154(b) by 0 days.

(21) Appl. No.: 10/420,624

(22) Filed: Apr. 22, 2003

(65) Prior Publication Data

US 2004/0213011 A1 Oct. 28, 2004

(51) Int. Cl.[7] .............................................. F21V 21/14
(52) U.S. Cl. ...................... 362/526; 362/549; 362/306; 362/274
(58) Field of Search ................................ 362/526, 548, 362/549, 369, 390, 306, 274, 288, 286; 200/52 R, 61.58 R; 335/205, 219; 315/82, 83; 340/815.4, 815.49, 815, 815.77

(56) References Cited

U.S. PATENT DOCUMENTS

| | | | |
|---|---|---|---|
| 1,245,331 A | * 11/1917 | Godley | 362/274 |
| 2,051,324 A | * 8/1936 | Williamson | 362/475 |
| 2,906,862 A | * 9/1959 | McCammon | 362/10 |
| 3,300,636 A | 1/1967 | Quelland | |
| 3,327,110 A | * 6/1967 | Baldwin | 362/548 |
| 3,666,940 A | * 5/1972 | Magi | 362/410 |
| 3,678,266 A | 7/1972 | Fradette | |
| 4,114,071 A | * 9/1978 | Thrower et al. | 315/226 |
| 4,713,732 A | 12/1987 | Schamblin | |
| 4,843,522 A | 6/1989 | Rosenberg | |
| 5,050,044 A | * 9/1991 | Shibayama | 362/18 |
| 5,465,195 A | * 11/1995 | Jenner et al. | 362/523 |
| 5,523,933 A | * 6/1996 | Swanson | 362/390 |
| 6,565,237 B2 | * 5/2003 | Leung | 362/369 |

* cited by examiner

Primary Examiner—Thomas M. Sember
Assistant Examiner—Hargobind S. Sawhney
(74) Attorney, Agent, or Firm—Boris Leschinsky

(57) ABSTRACT

An emergency taillight for a vehicle includes a reflective housing with a transparent cover and a light source resiliently suspended in the focal center thereof. In the first embodiment, the light source is energized by a periodic source of electrical power to provide the impression of flickering light both during the movement of a vehicle as well as when it is standing still and no vibration is transmitted to the resilient suspension means of the light source. According to the second and third embodiments, electromechanical means are provided to cause the oscillating motion of the light source even when the vehicle is not itself in motion. The invention provides for a better attraction of the observer to the emergency light in poor visibility conditions regardless of the presence of vehicle motion. One or more light bulbs, LEDs, or laser light diodes may be used as a source of light for the emergency light of the invention.

3 Claims, 2 Drawing Sheets

EMERGENCY TAILLIGHT FOR VEHICLES, ESPECIALLY FOR MOTOR VEHICLES

BACKGROUND OF THE INVENTION

The present invention relates generally to a vehicle taillight, preferably to a motor vehicle emergency taillight. More particularly, the taillight of the present invention includes a pulsing light source suspended in the vicinity of the reflector for a more complete and effective generation of an intensive light signal.

The art of emergency taillights for motor vehicles is well developed. In a typical taillight, a light source is used, for example a light bulb. It is usually located in the center of a round or oval housing equipped with a reflector. The position of the light source is preferably chosen to be at the focal point of the reflector. Upon energizing the light bulb generates an array of light rays which are reflected by the reflector to form a steady stream of light through a transparent light cover.

A variety of reflective surfaces have been disclosed in the prior art, including a stepped reflector. A number of reflective surfaces can be arranged over the back panel of the light to insure a uniform distribution of reflected light intensity and therefore a more attractive appearance of the taillight. The design of such emergency light allows for a more intense light to be visible under poor visibility.

Poor visibility conditions present a special challenge for safe driving in general, and for brake and emergency taillight designs in particular. Given the same light source, it has long been the objective of the taillight designers to maximize the light visibility, increase the brightness of the reflected light and increase the effectiveness of light generation.

Most known taillight designs have their light source rigidly fixed in place. The reflector is designed to maximize the light signal but there is an inherent limitation in its ability to do so due to the fact that not all surface of the reflector can direct the light towards its target. The problem is compounded by the fact that more than one person may have the need to see the taillight at the same time so the design has to be able to direct the high intensity light in various directions all at the same time. Light sources fixedly positioned relative to the reflector can not physically accomplish this objective. As a result, one driver may see the taillight of the car in front of him better than the driver next to him. This creates a potential for a safety concern especially on a high-speed road such as a highway and in poor visibility conditions such as during the rainfall or snowfall.

Attempts have been made to design a taillight with movable light source, movable reflector or combination thereof. Schamblin shows one possible design in the U.S. Pat. No. 4,713,732. It shows a flexible light panel supported by a resilient support member. The movement of the vehicle or the upcoming wind may cause the movement of the light panel and therefore redirect the light in various directions so that it is visible from a wider angle of view. Other designs showing the use of springs to support the light bulb are shown in the U.S. Pat. Nos. 3,678,266 and 3,300,636.

Rosenberg et al describes a more sophisticated version of such design in the U.S. Pat. No. 4,843,522. Disclosed is a resilient light source support element designed to oscillate the light source during the motion of the vehicle. In addition, the reflector may also be mounted on a resilient support member so that the dispersion of light is further intensified.

The inherent limitation of devices in the prior art is in the fact that they all require a source of external vibrations in order to create the flickering light effect. If the vehicle is moving slowly or even not moving at all, the flickering of the light ceases. The need exists therefore for an emergency taillight capable of projecting a high intensity light over a wide view angle under all conditions of use including the absence of vehicle movement and subsequent external vibrations as the only source of flickering for the taillight.

SUMMARY OF THE INVENTION

Accordingly, it is an object of the present invention to overcome these and other drawbacks of the prior art by providing a novel emergency taillight design to allow for a wide-angle reflection of a light signal to improve its visibility even when the vehicle is not moving.

It is another object of the present invention to provide a taillight for a vehicle allowing for a more efficient light generation with uniform intensity from various directions.

It is a further object of the present invention to provide a taillight with improved visibility and light intensity without increase in its size and power consumption.

The design of a taillight of the invention is based on a principle of a movable light source. The main concept is to cause the light source to move or oscillate relative to the reflector surface during both the movement of the vehicle as well as when it is not moving. Both the reflector and/or the light source can be made to oscillate from a dedicated electromagnetic source. From the practical consideration, it is easier to fix the reflector in place and to make the light source movable. It is accomplished by a number of ways. In the most preferred embodiment, the light source is resiliently suspended and its electrical power is supplied through the pulsation means. During the movement of a vehicle, vibration is generated and that causes the light source to move around its point of suspension in a chaotic way. The design of the spring assumes a certain restrictions on that movement. The movement of the light source causes the entire reflective surface of the reflector to direct the light signal of high intensity towards slightly varying direction increasing therefore the view angle of the device. An interrupter is included as a pulsation means in the light source power supply so that it provides for pulsing light independently of the mechanical motion of the light source itself. Therefore, even when the vehicle is not moving, at least some level of light pulsations is achieved, which is believed to be better for visibility than the regular steady light. The preferred embodiment of the invention addresses a common problem associated with the flickering lights of the prior art, namely the absence of flickering when the vehicle is not in motion. Therefore, it can be used advantageously in taillights of the automobiles.

Additional embodiments of the invention provide for means for forcing the oscillation even when the vehicle is not moving. A combination of a stationary electromagnet positioned in the vicinity of the light source and a permanent magnet attached to the light source allow to provide for such oscillations upon intermittent activation of the electromagnet.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE PREFERRED EMBODIMENT OF THE INVENTION

A detailed description of the present invention follows with reference to accompanying drawings in which like elements are indicated by like reference letters and numerals.

Figure 2:
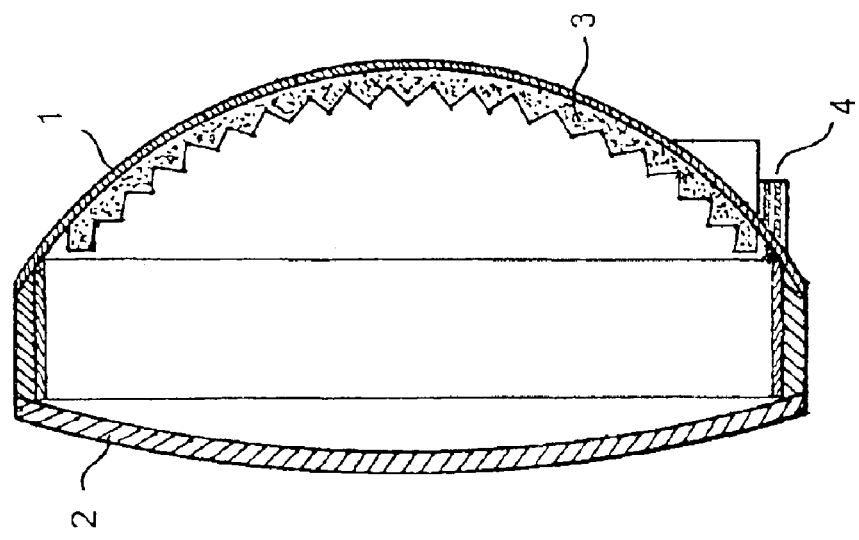
FIG. 2 is a cross-sectional side view of the same embodiment of the invention.
Figure 1:
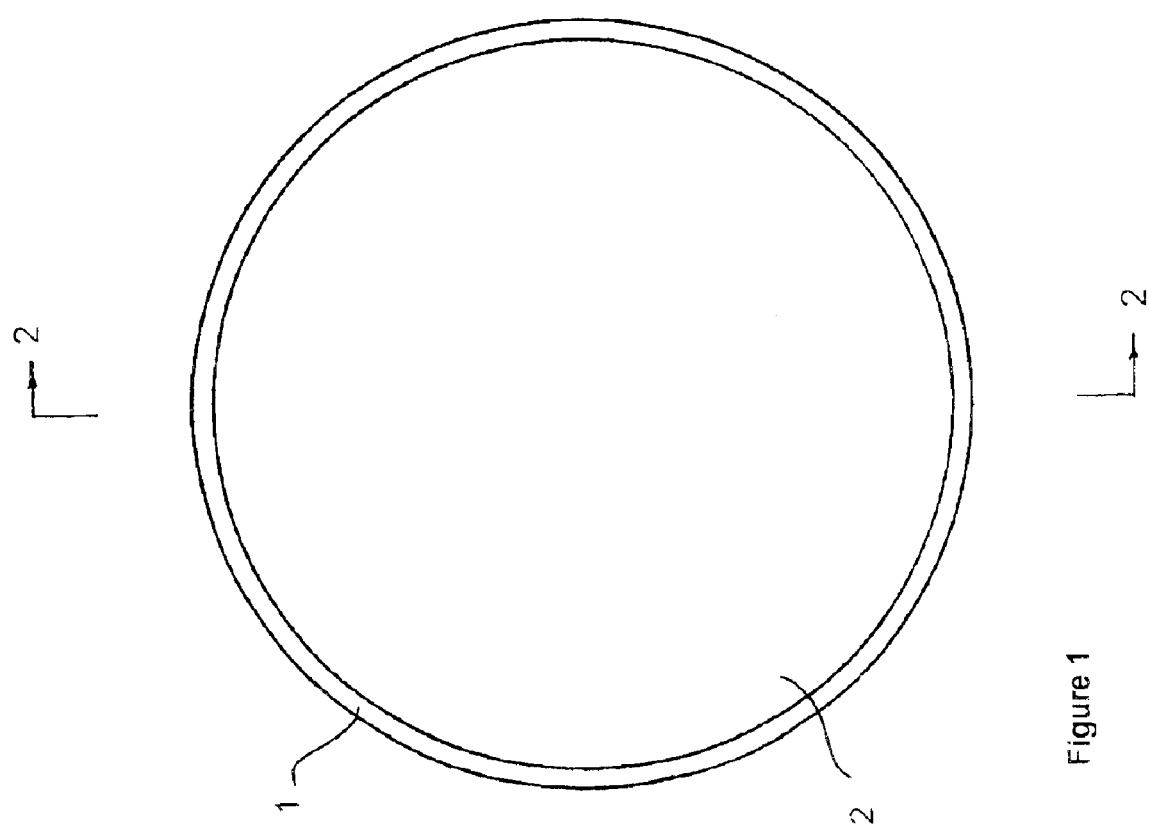
FIG. 1 is a front view of the taillight housing of the first and most preferred embodiment of the invention. The front view means a view from the transparent cover.

FIGS. 1 and 2 show the design of the first and most preferred embodiment of the invention. It has an oval or round housing 1 equipped with a transparent cover 2. The design of the housing repeats in general commonly known designs for automobile taillights. The inside surface of the housing 1 is covered with a reflector 3, which is made of a reflective coated fabric or paper and may have an optional stepped design as described in the patents of the prior art (see for example the U.S. Pat. No. 6,200,006). Electrical connectors 4 are located outside the lower portion of the housing 1 to provide electrical energy to the light source. This basic design of the housing, reflector and the transparent cover is the same for all the various embodiments of the invention. The difference is only in the design of the light source and its suspension within the housing.

Figure 3:
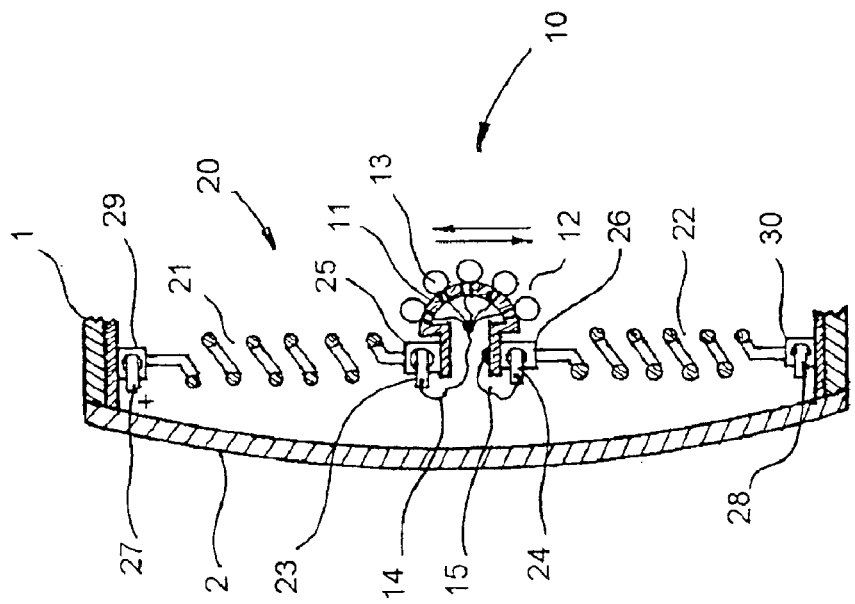
FIG. 3 is a cross-sectional side view of the light source of the first embodiment of the present invention.

FIG. 3 depicts a light source 10 of the first embodiment of the invention. It is made with a hollow cylinder 12 closed at one end with an oversized oval cover 11 to resemble a mushroom shape. One or more light elements 13 are placed on the exterior surface and through the multiple openings of the oval cover 11. A small light bulb, light emitting diode, or a laser light diode may be used as a light element 13 for the present invention. Several light elements 13 are distributed throughout the surface of the oval cover 11 to provide a good coverage of the reflector 3 of the housing 1. The central contacts of all light elements 13 are connected to each other and to a common insulated electrical wire 14 leading ultimately to the outside electrical connector 4. The side contacts of all light elements 13 are also connected to each other through a wall of the oval cover 11 and to a common electrical wire 15 eventually terminating also in the electrical connector 4 as will be explained in more detail below. In case it is preferred to make a cylinder wall from an isolating material rather than a conductive one, separate wires are needed to connect all the side contacts of the light elements 13 together. The preferred location of the connector 4 is at the bottom of the housing on its outside surface. Electrical signal is transmitted to the connector 4 from the taillight control unit of the vehicle (not shown).

The light source 10 is positioned on the inside of the housing 1 and is supported by a light suspension element 20. In this embodiment, it consists of the first spring 21 and the second spring 22 on the opposite side of the housing 1. The springs 21 and 22 are produced from a conductive metal wire and can be made to have a cylindrical or a tapered shape. It is preferred to orient the springs vertically so that gravitational forces can be used to cause the motion of the light suspension unit while the vehicle is in motion. The light source 10 is suspended on the springs 21 and 22 in the following way. The hollow cylinder 12 is attached to both the central end 23 of the spring 21 and the central end 24 of the spring 22 via electrically isolating inserts 25 and 26 respectively. At the same time, the central end 23 of the spring 21 is electrically connected to the central contacts of the light elements 13 via the wire 14. In addition, the central end 24 of the spring 22 is connected to the side contacts of the light elements 13 via the wire 15.

The peripheral ends 27 and 28 of the respective springs 21 and 22 are attached to the housing 1 via electrically, isolating inserts 29 and 30. These peripheral ends are in turn connected electrically through a pulsation means to the electrical connector 4. Pulsation means constitute an integral part of the power supply for the light and may be a commonly known electrical interrupter unit with optionally adjustable frequency of pulsations controlled by the vehicle's central computer system, which is not shown on the drawings. It can be positioned inside or outside the housing 1. Its provides normal voltage to the light source 10 with interrupted and optionally adjustable frequency.

In use, during the movement of a vehicle, the springs 21 and 22 transform all the vibrations from the vehicle's body into the oscillating movement of the light source 10 at all times, similar to the designs of the prior art. Its stiffness is chosen to provide for continuous movement of the light source 10 around its central point. Upon activation of the light source 10 via the electrical connector 4, the light elements 13 provide illumination to the reflective surface 3 at various and ever-changing angles due to their continuous movement. This light is then reflected and directed towards the transparent cover 2. Because of high frequency of the movements of the light source 10, the reflected light is visible from a wider angle by all the different observers as a source of bright pulsating light, therefore improving the ability of others to see the vehicle. The addition of deliberate pulsations provided by a pulsating means, the light of the invention further improves the flickering action and provides for an even better visibility in comparison with the previously known designs. It allows for enhanced visibility of the pulsing emergency light when the automobile is not moving or disabled. The emergency taillight of the present invention is especially beneficial in conditions of poor visibility and at nighttime.

Because of its improved visibility and wide angle of view, low energy LED may be alternatively used in place of standard light bulbs to save electrical energy but preserve the visibility of the vehicle.

In a variation of this embodiment, several different light elements may be assembled within the light source 10. For example, light elements of different colors or different intensity may be used if necessary. The vehicle central computer control unit has to be equipped to handle turning these lights on and off depending on the situation. One particularly advantageous example of this design is a combination of a taillight and a brake light where light elements of the same color but different intensity may be used. Another advantageous variation includes the use of light elements of different colors. The control unit can be designed to turn on different color light elements in different situations.

DETAILED DESCRIPTION OF THE SECOND EMBODIMENT OF THE INVENTION

Figure 4:
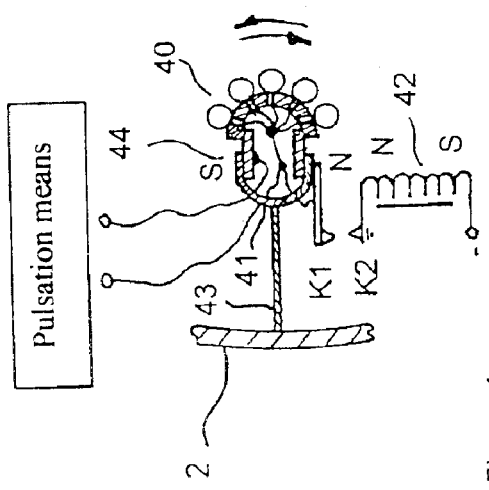
FIG. 4 is a cross-sectional side view of the light source and magnetic means according to the second embodiment of the invention.

The second embodiment of the invention is shown on FIG. 4. It is intended to further improve the visibility of the emergency taillight of the invention, especially in the situation when the automobile is not moving. It provides for additional means to force the oscillation of the light source of the taillight even when the vehicle is not in motion.

The basic design of the second embodiment is similar to the first embodiment. The light source 40 is different from the light source 10 in that it is supported on a flat spring 43 via attachment 41 (it should be understood that the same pair of springs as shown on FIG. 3 may also optionally be used for the design of the second embodiment with some appropriate modifications). One end of the spring 43 is attached to the center of the transparent cover 2 while the other end is attached to the hollow cylinder of the light source 40. Light source 40 is equipped with a permanent magnet 44 with respective North and South poles located as shown on the drawing.

Electromagnet 42 is placed in the vicinity of the light source 40 in such a way that it has its North pole located opposite the North pole of the permanent magnet of the light source 40. Optionally, electrical power is provided to the electromagnet 42 from a separate battery in order not to increase the drain on the vehicle's battery. The electromagnet 42 also supports a contact K2 located opposite and normally touching the contact K1 on the spring 43 to make this pair of contacts normally closed. Note that electrical power is supplied to the electromagnet 42 only when the contacts K1 and K2 are touching each other.

The pair of magnets comprising the permanent magnet and the electromagnet positioned in the vicinity thereof provides in combination the means for forcing the periodic movement or oscillations of the light source of the taillight.

In use, the movement of an automobile causes gravitational forces to move the light source 40 on the spring 43 up and down similarly to the first embodiment of the invention. When the light source is activated, electricity is supplied to the light source 40 to activate the pulsating light to emanate from the light elements. Also, electricity is supplied to the electromagnet 42, which is instantly activated due to the touching contacts K1 and K2. This activation of the electromagnet causes its energizing and forces the light source 40 away from the electromagnet 42 because of the presence of two poles of the same North type in the vicinity of each other. This force is combined with the oscillation forces caused by the vibration of the vehicle. As the light source 40 moves away from the electromagnet 42, contact K1 disengages from contact K2 and interrupts therefore the power supply to the electromagnet 42. The inertia of the motion of the light source 40 away from the electromagnet 42 causes tension in the spring 43. The spring 43 forces the light source 40 back towards the electromagnet 42. On the back swing, the light source 40 causes the contacts K1 and K2 to engage again restoring the power supply to the electromagnet 42. The cycle then repeats itself. The frequency of oscillations of the light source 40 depends on the mass of the light source assembly, elasticity of the flat spring and the energy developed by the electromagnet 42. All of these parameters are easy to calculate to provide for a desired operation of the taillight of the present invention.

The main advantage of the second embodiment of the invention is when the engine of the vehicle is not working such as when the vehicle is in emergency conditions. The accumulator can still provide for flickering lights operation for a longer time or they can be seen better than the regular emergency lights due to its lower power consumption. In the moving situation, the light of the invention provides for a reliable source of oscillations for the light source 40 in addition to the regular automobile vibrations. It would ensure the presence of the flickering and attention grabbing emergency light regardless of whether the vehicle is moving or not.

DETAILED DESCRIPTION OF THE THIRD EMBODIMENT OF THE INVENTION

Figure 5:
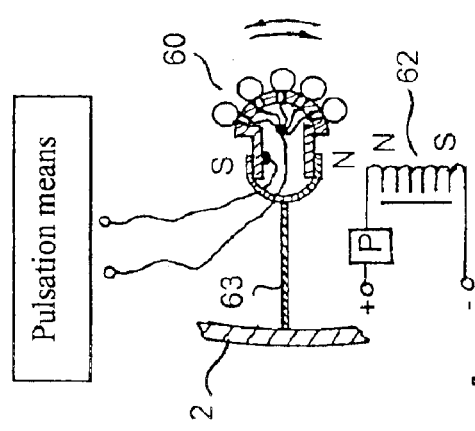
FIG. 5 is a cross-sectional side view of the light source with magnetic means and pulsation means according to the third embodiment of the present invention.

FIG. 5 depicts the design of the light source 60 of the third embodiment of the present invention. The main distinction of this design from the one described above for the second embodiment of the invention is in the fact that the frequency of oscillation is determined not by mechanical oscillations of the light source assembly on the spring 63, but by the second electrical interrupting device "P" included in the power line for the electromagnet 62. This device "P" defines the frequency of oscillation by supplying electrical power to the electromagnet 62 at a predefined rate.

The third embodiment of the invention also ensures reliable operation of the device especially when the vehicle is not moving (such as when it is disabled) or moving very slowly.

Another optional improvement for all of the above-described embodiments is their use for a dual function—as an emergency light as well as a turn signal light.

Although the invention herein has been described with respect to particular embodiments, it is understood that these embodiments are merely illustrative of the principles and applications of the present invention. It is therefore to be understood that numerous modifications may be made to the illustrative embodiments of the invention. For example, the principle of the invention can be used to design a stand-alone emergency light, construction light, or a stand-alone advertising station. In direct use, the invention can be used for all types of moving vehicles such as a car, a truck, a motorcycle, a bicycle, an airplane, a boat and alike. Note also that other arrangements may also be devised without departing from the spirit and scope of the present invention as defined by the appended claims.

What is claimed is:

1. An emergency vehicle light comprising:

a light reflective housing with a transparent cover;

a light source having at least one light element, said light source supported within said housing by resilient light suspension means;

a first power supply means for providing said light source with electrical power; and an electrically powered oscillation means to drive said light source to oscillate within said housing;

wherein said light source providing for a flickering light emanating from said vehicle light regardless whether said vehicle is moving or not.

2. The vehicle light as in claim 1, wherein said oscillation means comprising a permanent magnet attached to said light source and an electromagnet fixedly attached to said housing and positioned in the operational vicinity of said permanent magnet, said electromagnet equipped with a second electrical power supply to provide pulsating electrical power, wherein said light source is forced to move away from said electromagnet upon providing electrical power thereto.

3. The vehicle light as in claim 2, wherein said second electrical power supply is equipped with a pair of normally closed electrical connectors consisting of a first connector attached to said light source and a second connector attached to said electromagnet and placed in touch with said first corrector when the vehicle is not in motion, wherein movement of said vehicle or energizing of said second power supply causing maid pair of connectors to disengage and cut off electrical power to said electromagnet.

* * * * *